United States Patent [19]

Benard et al.

[11] Patent Number: 5,500,337

[45] Date of Patent: Mar. 19, 1996

[54] DYES COMPRISING THIOETHER MACROCYCLES

[75] Inventors: Rejane Benard, Bois le Roi; Gerard A. D. Friour, Chalon-sur-Saone; Didier J. Martin; Marcel L. P. Riveccie, both of Givry, all of France

[73] Assignee: Eastman Kodak Company, Rochester, N.Y.

[21] Appl. No.: 211,790

[22] PCT Filed: Oct. 14, 1992

[86] PCT No.: PCT/EP92/02359

§ 371 Date: Apr. 15, 1994

§ 102(e) Date: Apr. 15, 1994

[87] PCT Pub. No.: WO93/08505

PCT Pub. Date: Apr. 29, 1993

[30] Foreign Application Priority Data

Oct. 15, 1991 [FR] France .................... 91 12942

[51] Int. Cl.$^6$ .................... G03C 1/12; G03C 1/14
[52] U.S. Cl. .................... 430/570; 430/581; 430/583; 430/584; 430/585; 430/587; 430/591; 430/593; 430/595; 546/135; 548/100; 548/156; 548/219; 548/305.7
[58] Field of Search .................... 430/591, 593, 430/595, 580, 581, 583, 584, 585, 587; 546/135; 548/100, 156, 219, 336

[56] References Cited

U.S. PATENT DOCUMENTS

| | | | |
|---|---|---|---|
| 3,021,215 | 2/1962 | Williams et al. | 96/100 |
| 3,046,129 | 7/1962 | Graham et al. | 96/55 |
| 3,046,132 | 7/1962 | Minsk | 96/108 |
| 3,046,133 | 7/1962 | Minsk | 96/108 |
| 3,062,646 | 11/1962 | Dann et al. | 96/66 |
| 3,148,187 | 9/1964 | Heseltine | 260/240.4 |
| 3,271,157 | 9/1966 | McBride | 96/107 |
| 4,729,946 | 3/1988 | Kasama et al. | 430/591 |
| 4,865,965 | 9/1989 | Friour et al. | 430/569 |
| 4,987,064 | 1/1991 | Saitou et al. | 430/570 |

FOREIGN PATENT DOCUMENTS

| | | |
|---|---|---|
| 295190 | 12/1988 | European Pat. Off. . |
| 372573 | 6/1990 | European Pat. Off. . |
| 177279 | 1/1965 | U.S.S.R. .................. 430/591 |

OTHER PUBLICATIONS

Chemical Abstracts, vol. 100, No. 4, 23 Jan. 1984 Columbus, OH, US; Abstract No. 28088s, P. Chu et al. "Spectral Sensitization by Cyanine Dyes Coupled with Crown Ethers" p. 337.

Kexue Tongbao, vol. 28, No. 6, Jun. 1983, pp. 762–766, Chu Pufen et al.

*Primary Examiner*—Lee C. Wright
*Attorney, Agent, or Firm*—Gordon M. Stewart; Edith A. Rice

[57] ABSTRACT

The present invention relates to polymethine spectral sensitising dyes comprising at least one intracyclic thioether function macrocycle.

These special sensitising dyes may be used in silver halide photographic products.

These spectral sensitising dyes improve the sensitivity of the photographic products whilst reducing the residual dye stain.

16 Claims, No Drawings

DYES COMPRISING THIOETHER MACROCYCLES

The present invention relates to polymethinic spectral sensitising dyes comprising at least one intracyclic thioether function macrocycle, and their use in silver halide photographic products. These spectral sensitising dyes improve the sensitivity of the photographic products whilst reducing the residual dye stain.

It is know that macrocyclic thioethers can be used at various stages in the manufacture of emulsions used in photography.

U.S. Pat. Nos. 3,021,215, 3,046,129, 3,046,132, and 3,046,133 describe the use of macrocyclic thioethers in the chemical sensitisation process.

U.S. Pat. Nos. 3,062,646 and 3,271,157 describe thioether macrocycles useful as chemical sensitisers and as solvents for silver halides.

European patent EP 295 190 describes photographic products using functionalised thioether macrocycles as antifogging agents.

In a publication Kexue Tongbao, Vol 28 No 6, June 1983, p.762–766, Chu Pufen et al describe carbocyanines comprising macrocycles with intracyclic oxygen atoms. These sensitising dyes comprising a macrocyclic ether improve the sensitometric properties when they are used on conventional emulsions. These documents do not mention the problem of residual dye stain.

Residual dye stain appears in a photographic product when the sensitising dye is not totally eliminated during the photographic processing.

The problem of residual dye stain in photographic products is related to the nature and quantity of spectral sensitising dyes used; it manifests particularly with emulsions requiring high quantities of sensitising dyes such as tabular grain emulsions, or with products requiring short processing times, such as products for radiography. The residual dye stain problem can be remedied by increasing the solubility of the sensitising dyes. U.S. Pat. No. 3,148,187 describes cyanine and merocyanine dyes carrying solubilising sulpho groups. The residual dye stain of the photographic products using these dyes decreases, but also a deterioration in the sensitometric characteristics is observed.

In fact the presence of the solubilising group which causes dissymmetry in the dye molecule is not favourable to the formation of J aggregates responsible for the spectral sensitivity given to the emulsion by the dye.

It was therefore necessary to find dyes which do not lose their spectral sensitising power whilst reducing the residual dye stain of the photographic products after processing.

The present invention relates to spectral sensitising dyes of the polymethine type comprising at least one macrocyclic thioether radical which comprises at least one sulphur atom and at least one oxygen atom, each sulphur or oxygen atom being separated from another sulphur or oxygen atom by an alkylene group comprising at least two carbon atoms.

The spectral sensitising dyes of the present invention are of a conventional polymethine type such as cyanines, merocyanines, complex cyanines or merocyanines, oxonols, hemioxonols, styryls, merostyryls, neocyanines and streptocyanines. These polymethine dyes generally consist of two heterocyclic rings connected by a methine chain with the formula $-(C=C)_n-$, n being an integer equal to or greater than 1.

The position of the macrocyclic thioether radical in the spectral sensitising dye is not decisive in the case of the present invention. The thioether macrocycle—sensitising dye bond may be produced in any position on the heterocyclic ring or rings.

The macrocyclic thioether radical may be condensed directly onto the polymethine dye or be a substituent on the polymethine dye.

When the macrocyclic thioether radical is condensed directly onto the polymethine dye, the sensitising dyes of the invention may be represented by the formula

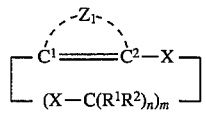

where

X represents a sulphur or oxygen atom, with the additional requirement that it represents at least one sulphur atom and at least one oxygen atom, $R^1$ and $R^2$ are independently a hydrogen atom or an alkyl, aryl or alkenyl group, either substituted or not, m is an integer equal to or greater than 1, n is an integer equal to or greater than 2, $Z^1$ represents the atoms required to form, with the $C^1$ and $C^2$ carbon atoms, the polymethine dye.

If it is considered that $Z^1$ with $C^1$ and $C^2$ represents the atoms required to obtain a cyanine, the dye of the invention has the formula:

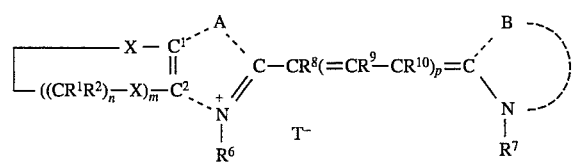

where $R^6$, $R^7$ represent independently an alkyl, hydroxyalkyl, alkoxy, amine or amide group, substituted or not, solubilising groups or another chromophore group, $R^8$, $R^9$ and $R^{10}$ are independently a hydrogen atom, an alkyl group, substituted or not, or taken together, represent the atoms required to form a saturated or unsaturated hydrocarbon ring which may contain one or more heteroatoms, A and B are independently the atoms required to form the radicals of the thiazole, thiadiazole, benzothiazole, naphthothiazole, oxazole, benzoxazole, naphthoxazole, selenazole, benzoselenazole, naphthoselenazole, tellurazole, benzotellurazole, naphthotellurazole, quinoline, isoquinoline, naphthoquinoline, imidazole, benzoimidazole, naphthoimidazole, pyridine, benzopyridine or naphthopyridine groups, substituted or not, $T^-$ is a complementary ion to balance the ionic charge of the nitrogen when $R^6$ is neutral, chosen from amongst the halides or the tetrafluoroborate, triflate or alkyl or aryl sulphonate groups, p is between 0 and 3.

When the polymethine dye is replaced by at least one thioether macrocycle, the dye of the present invention can be represented by one of the following formulae:

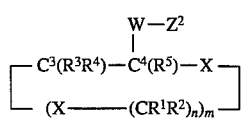

-continued

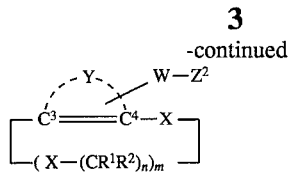

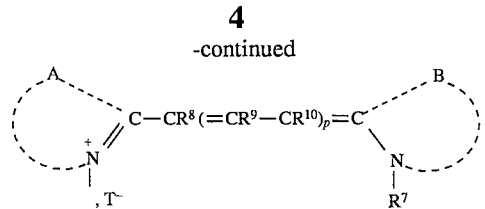

where
$R^1$, $R^2$, X, n and m are as defined above, and
$R^3$, $R^4$ and $R^5$ are independently a hydrogen atom, an alkyl group, substituted or otherwise, Y represents the atoms required to form, with the $C^3$ and $C^4$ carbon atoms, a heterocyclic or carbocyclic aromatic compound, $Z^2$ is a polymethine spectral sensitising dye radical, W is a single bond or a saturated or unsaturated hydrocarbon chain, substituted or otherwise, which may comprise one or more groups chosen from amongst the aryl, carboxy, sulphonyl, amino or amido groups and/or one or more heteroatoms chosen from amongst a sulphur, oxygen, nitrogen, selenium, tellurium or phosphorus heteroatom.

If the $Z^2$ radical of the sensitising dye is a cyanine, then $Z^2$ may be represented by one of the following formulae:

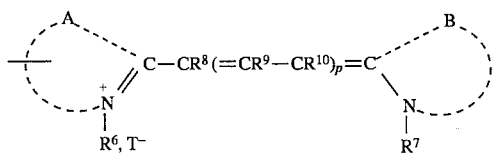

where
A, B, the groups $R^6$, $R^7$, $R^8$, $R^9$, $R^{10}$, $T^-$ and the integer p are as defined above.

The solubility of the dyes of the present invention can be improved by choosing $R^6$ and $R^7$ from amongst the ; alkylsulphone or alkylcarboxylate solubilising groups, $—(CH_2)_x—CF_3$, x being between 0 and 4, since these groups do not impair the sensitometric properties.

The spectral dyes which have been synthesised within the scope of the present invention are blue-sensitive monomethine dyes. From the reaction diagrams cited in the examples, the synthesis of red or green-sensitive spectral sensitising dyes, having macrocyclic thioether radicals can be envisaged.

The following dyes illustrate the present invention without limiting its scope.

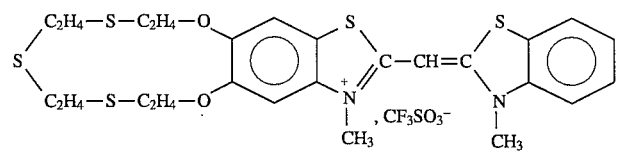

C1

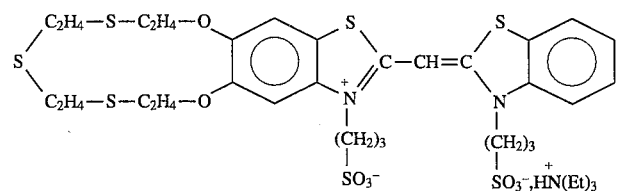

C2

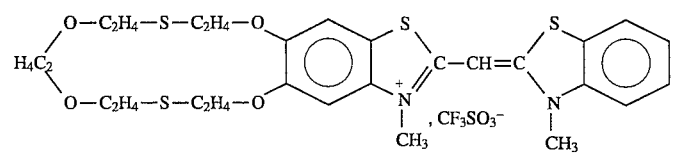

C3

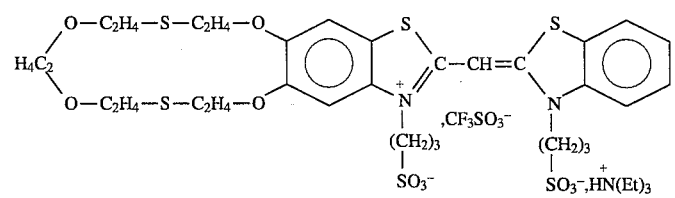

C4

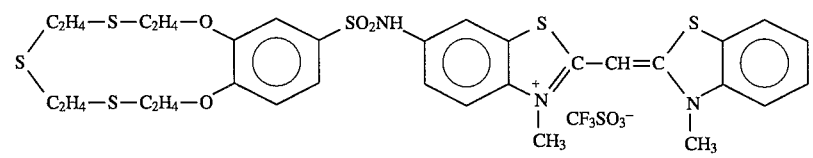

C5

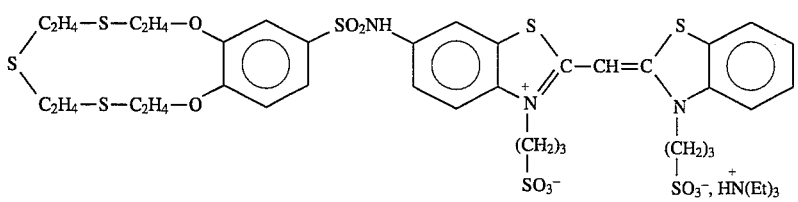

The spectral sensitising dyes of the present invention are used in photographic products such as reversible products, negative products and products which can be used for radiography. The sensitising dyes are in general absorbed on the silver halide grains according to a predetermined coverage rate which depends on the structure of the grains and/or dye used.

These photographic products in general comprise a support and at least one layer of silver halide emulsion. The preparation of the silver halide emulsion is described, for example, in *Research Disclosure,* December 1978, No 17643, parag. I and II. Silver halide emulsions can be chemically sensitised according to the methods described in para III of the *Research Disclosure* referred to above. The chemical sensitisers generally used are compounds of sulphur and/or selenium and gold. It is also possible to use sensitisation by reduction. The halide grains may have different compositions. It is possible, for example, to use silver bromide, silver iodobromide, silver chloride or silver chlorobromoiodide grains. The silver halide grains may be spherical, cubic, oxtahedral, cubo-octahedral or tabular. The silver halide grains may be of the core/shell type, for example as in U.S. Pat. No. 3,505,068, or may have epitaxial depositions as in U.S. Pat. No. 4,713,320. The halide grains are dispersed in a hydrophilic colloid. The dispersion media which may be used are described in paragraph IX of the *Research Disclosure* referred to above. The emulsions may be polydispersed or monodispersed, or may consist of mixtures of emulsions having different grain sizes and/or dispersibilities.

The methods of spectral sensitisation are described in the same publication, para IV. The sensitising dye may be added at various stages in the preparation of the emulsion, in particular before, during or after the chemical sensitisation.

The photographic products of the invention may contain, amongst other things, optical brighteners, anti-fogging compounds, surfactants, plasticising agents, lubricating agents, hardeners, stabilising agents or absorption and/or diffusion agents as described in paras V, VI, VIII, XI, XII and XVI.

The methods of adding these different compounds and the coating and drying methods are described in paras XIV and XV.

The supports which are useful in the photographic products are described in paragraph XVII.

In the case of colour photographic products, products are preferably used in which the image formation takes place by means of a colour developer or through couplers forming yellow, cyan and magenta dye. These photographic products are described in para XIX.

Photographic tests using spectral sensitising dyes of the present invention have been carried out with a tabular grain emulsion. Tabular grain emulsions are emulsions which have an aspect ratio of between 5 and 30, preferably greater than 8. The preparation of these emulsions is described in *Research Disclosure* Vol 225, January 1983, No 22534. The quantity of sensitising dyes absorbed is much larger with this type of emulsion than with conventional emulsions. Photographic emulsions containing tabular grains are therefore liable to have a significant residual dye stain resulting from an inadequate elimination of this larger quantity of dye during the photographic processing.

Under these conditions of use, it has been possible to demonstrate that the use of spectral sensitising dyes comprising at least one macrocyclic thioether radical results in a significant reduction in the residual dye stain whilst retaining good sensitometric properties.

EXAMPLES

Example 1

The compounds C1, C2, C3 and C4 can be synthesised from the intermediate compound benzothiazole carrying a macrocyclic thioether radical of the general formula

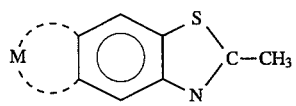

M representing the atoms required to form the macrocyclic thioether radical.

The intermediate compounds I1 and I2 can be obtained from orthodiphenol in accordance with the following steps:

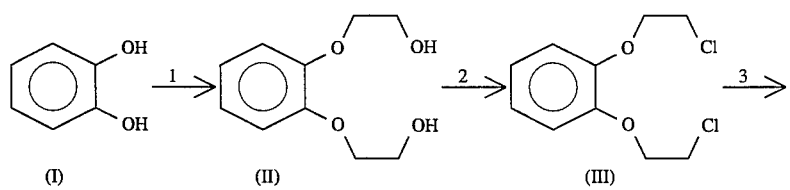

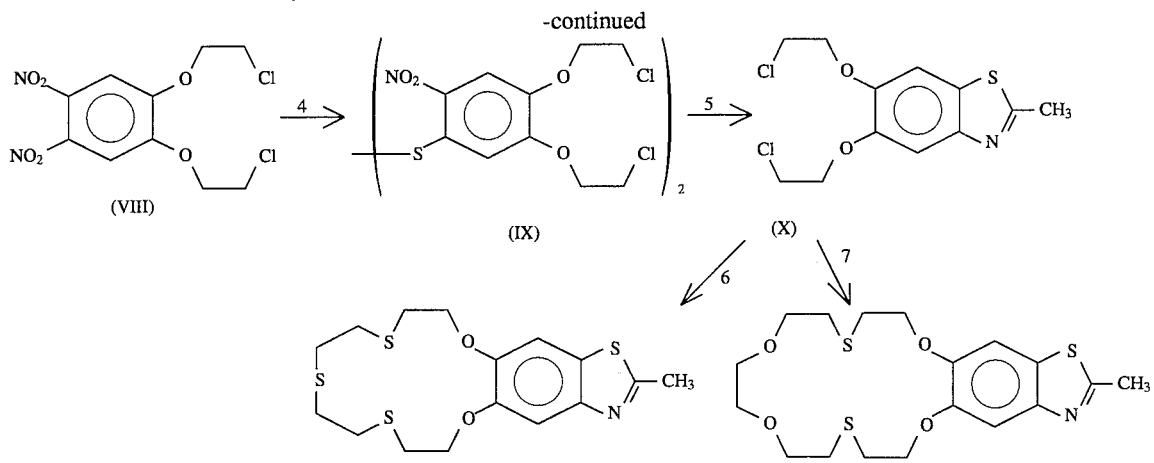

STEP 1

Preparation of di(β-hydroxyethoxy-1,2-benzene (II)

In a 100 ml three-necked flask under nitrogen, 8 g (0.2 mole) of ground sodium hydroxide is mixed with 10 ml of ethanol. The reaction mixture is taken to reflux for one hour, and then 11 g (0.1 mole) of pyrocatechol is added all together. The heating is maintained for one hour, and then 10 ml of dioxane and 1 ml of a 200 mg/l solution of dicyclohexyl [18]-crown-6 is added to the ethanol. 2-chloroethanol (13.4 ml, 0.2 mole) is added over a period of half an hour, and the reaction mixture is maintained at reflux for another 24 h.

After cooling, 100 ml of water is added to the reaction medium and extraction is carried out three times; with 100 ml of dichloromethane. The organic phases are brought together and dried on $MgSO_4$ and then evaporated under vacuum. The residue crystallises in isopropyl ether and a white solid precipitates. The precipitate is filtered on büchner and then dried under vacuum in a dryer. Compound II is used raw.

R= 90% (raw)

STEP 2

Preparation of 1,2-di(β-chloroethoxy)benzene (III)

In a 100 ml three-necked flask under nitrogen, 19.8 g (0.1 mole) of compound II is placed in suspension in 20 ml of pyridine. The reaction medium is heated under agitation at 50°–60° C., when the medium is homogeneous, 18.2 ml (0.24 mole) of thionyl chloride is added over a period of half an hour. The heating is maintained at 50° C. for 1 h. The reaction medium is then cooled and an equivalent volume of water is added. Compound III is extracted three times with 100 ml of dichloromethane. The organic phases are brought together and washed successively twice with 50 ml of 1N HCl, once with 50 ml of a saturated solution of $K_2CO_3$ and then with water until a neutral pH is attained. The organic phase is dried on $MgSO_4$ and then evaporated under vacuum. The residue crystallises in the presence of methanol. The beige precipitate is filtered on büchner and then dried in a dryer. (R=83%)

| * ANALYSIS OF ELEMENTS: TOTAL FORMULA = $C_{10}H_{12}Cl_2O_2$ | | M = 235 g |
|---|---|---|
| | C | H |
| % calculated: | 51.08 | 5.23 |
| % found: | 51.06 | 5.14 |
| MELTING POINT: 52° C. | | |

STEP 3

Preparation of 1,2-di(β-chloroethoxy)-4,5-dinitrobenzene (VIII)

In a 100 ml three-necked flask provided with effective agitation, 38 ml of nitric acid (d= 1.42) is introduced and cooled to 5° C. by means of an ice bath. Compound III (23.5 g, 0.1 mole) is added in small portions whilst the temperature is maintained below 7° C. The reaction being continued at 5° C., 20 ml of concentrated sulphuric acid is added slowly over approximately 15 min. Then the reaction medium is brought to ambient temperature and then the temperature is slowly raised to 55°–60° C. in successive stages (t=10° C.) over approximately 30 min. This temperature is maintained for 20 min. The medium is then cooled again and then poured into a beaker over crushed ice. The precipitate formed is dissolved in 300 ml of dichloromethane. The organic phase is washed twice with 200 ml of water and then dried over $MgSO_4$. A yellow solid is obtained after evaporation of the dichloromethane under vacuum.

| R = 100% | | | |
|---|---|---|---|
| * ANALYSIS OF ELEMENTS: TOTAL FORMULA = $C_{10}H_{10}Cl_2N_2O_6$ | | | M = 325 g |
| | C | H | N |
| % calculated: | 36.94 | 3.10 | 8.61 |
| % found: | 37.54 | 3.08 | 8.59 |

STEP 4

Preparation of 2,2'-dinitro-4,4',5,5'-tetra(β-chloroethoxy) diphenyldisulphide (IX)

Under nitrogen in a 500 ml three-necked flask provided with effective agitation, 32.5 g (0.1 mole) of compound VIII is mixed with 250 ml of methanol and heated to reflux (SOLUTION A).

In a 50 ml flask under nitrogen, 12 g of hydrous sodium sulphide ($Na_2S$, 9 $H_2O$) is dissolved in 25 ml of methanol at reflux. 1.6 g of flowers of sulphur is added to this solution and the reflux is maintained until dissolving has taken place (SOLUTION B).

Solution B is added drop by drop to Solution A, at reflux and under good agitation. The reflux is maintained for 2½ h and a yellow solid precipitates. The reaction medium is then cooled to 15° C. The yellow solid is filtered over büchner, washed with twice 25 ml of cold methanol and with ethyl ether in order to facilitate its drying. The yellow precipitate is then dried in a dryer under vacuum.

|   | R = 80% |   |   |   |
|---|---|---|---|---|
| * ANALYSIS OF ELEMENTS: | | | M = 622 g | |
| TOTAL FORMULA = $C_{20}H_{20}Cl_4N_2O_8S_2$ | | | | |
|   | C | H | N | S |
| % calculated: | 38.59 | 3.24 | 4.52 | 10.30 |
| % found: | 39.41 | 3.23 | 4.42 | 10.43 |
| * MELTING POINT: 127° C. | | | | |

STEP 5

Preparation of 5,6-di(β-chloroethoxy)-2-methylbenzothiazole (X)

In a 2 l three-necked flask under nitrogen, 31.1 g of compound IX is introduced with 300 ml of acetic acid and 300 ml of acetic anhydride. The reaction medium is heated to 40° C. and then 55 g of zinc in fine powder form is added in small portions over a period of 40 min. The reaction is exothermic and the temperature at the end of the addition is approximately 100° C. Then the reaction is continued at 120°–125° C. for 3½ hours. The medium is cooled and filtered over Clarsel$^R$. The solvents are evaporated under vacuum and a residual oil is obtained. Acetic acid is added to this oil in the ratio of 20 ml per gram of raw material and 1 g of anhydrous zinc chloride per gram of raw material. Under nitrogen, the mixture is heated at reflux for 3 h and then the acetic acid is eliminated under vacuum. The residue is mixed with 400 ml of dichloromethane. The organic phase is washed with 200 ml of water and than with a 10% solution of sodium hydroxide. After drying on $MgSO_4$ and evaporation of the solvent, a residual oil is obtained. This oil is chromatographed on silica gel (MERCK 60H: 40 parts) with dichloromethane as eluent. A white solid is recovered after evaporation of the solvent.

|   | R = 50% |   |   |   |
|---|---|---|---|---|
| * ANALYSIS OF ELEMENTS: | | | M = 306 g | |
| TOTAL FORMULA = $C_{12}H_{13}Cl_2NO_2S$ | | | | |
|   | C | H | N | S |
| % calculated: | 47.07 | 4.28 | 4.59 | 10.47 |
| % found: | 47.11 | 4.44 | 4.71 | 10.53 |

STEP 6

This cyclization step makes it possible to obtain I1 from compound (X) in the presence of the dithiol compound according to:

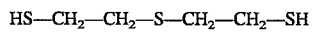

This cyclization can be effected under the experimental conditions described in *J.O.C.* 46, 22, 1981, p. 4481. This cyclization technique consists of using dimethyl formamide, the high dilution technique and the use of cesium carbonate. The use of cesium carbonate makes it possible to obtain a better selectivity for the cyclization reaction.

STEP 7

The intermediate compound I2 is obtained by cyclization of compound (X) in the presence of the dithiol compound according to:

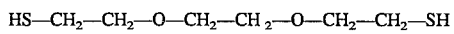

under the same operating conditions as in Step 6.

SPECTRAL SENSITISING DYES C1, C2, C3 AND C4 Obtaining compound C1 from I1

An N-alkylation of compound XI is carried out in the presence of trifluoromethane sulphonate. Under gentle experimental conditions, use of trifluoromethane sulphonate enables better selectivity to be achieved.

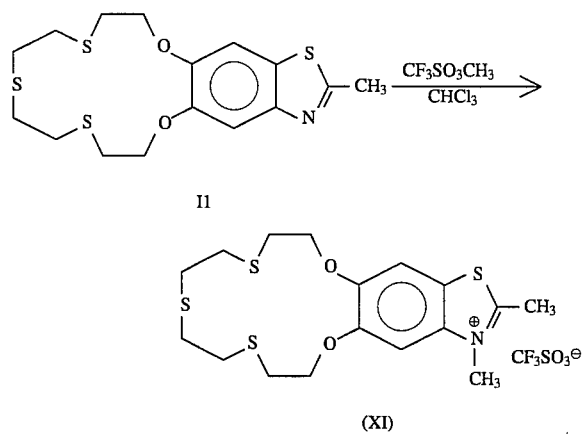

The thiacyanine C1 is obtained by condensing the previously synthesised compound (XII) with 3-methyl- 2-sulphobenzothiazolium hydroxide anhydride in solution in acetonitrile. The thiacyanine precipitates gradually as it forms.

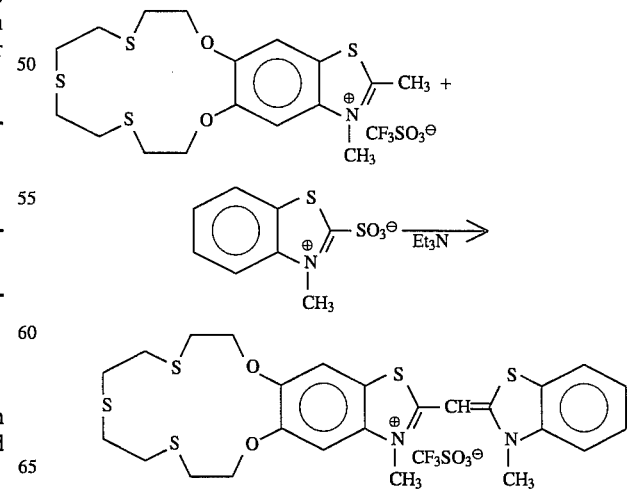

11

Obtaining compound C2 from compound I1

The nitrogen quaternation reaction takes place under the same conditions as for compound C1. This reaction takes place in the presence of sulpholane and propane sulphone in excess.

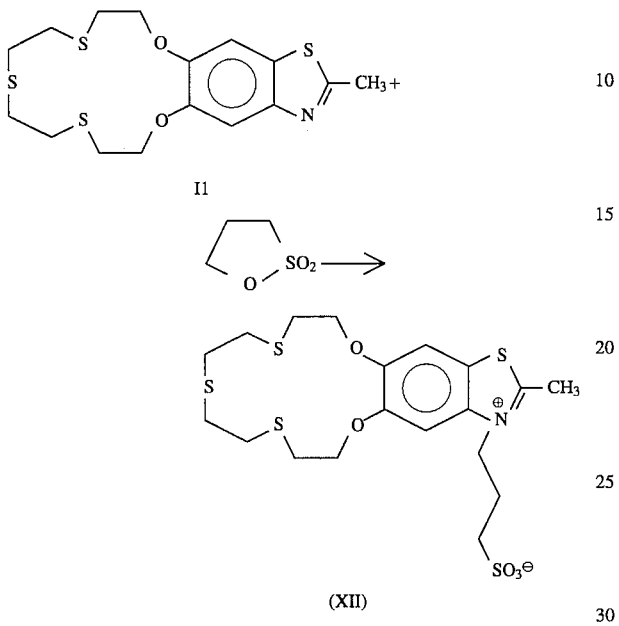

The thiacyanine C2 is obtained by condensing compound XII on compound (12)

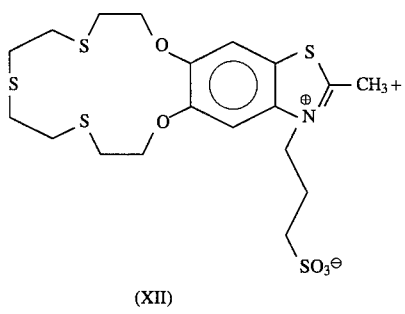

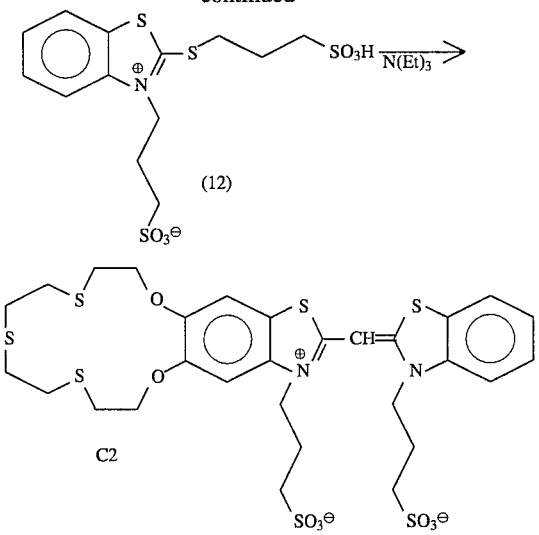

Obtaining dyes C3 and C4 from compound I2

Compound C3 is obtained from compound I2 under the same conditions as compound C1.

Compound C4 is obtained from compound I2 under the same conditions as compound C2.

Obtaining the spectral sensitising dyes C5 and C6

The compounds C5 and C6 are synthesised from the following benzothiazole intermediate I3:

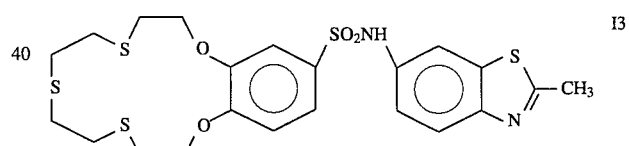

It may be obtained in accordance with the following steps from orthodiphenol:

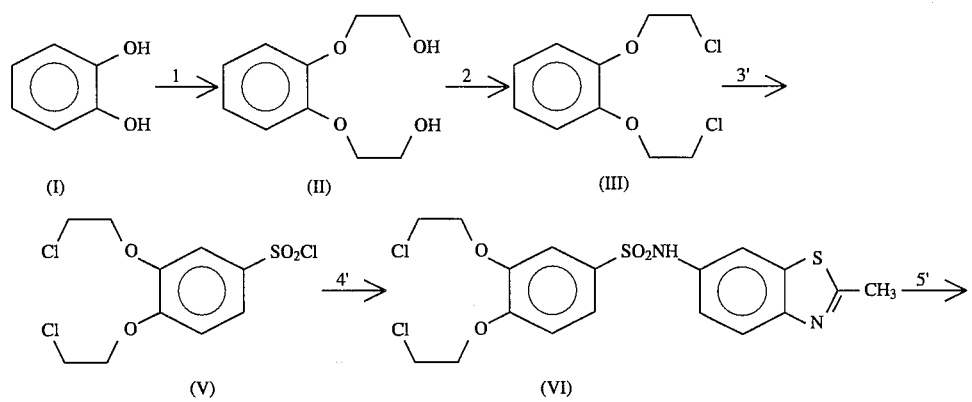

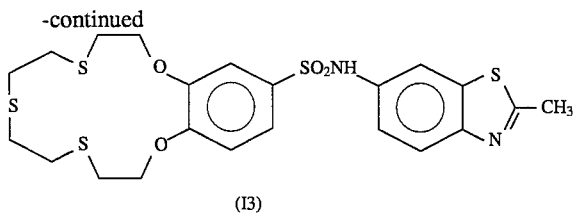

(I3)

Steps 1 and 2 are identical to steps 1 and 2 of the preparation of the intermediates I1 and I2.

Step 3' makes it possible to functionalise the 1,2-di(β-chloroethoxy)benzene with chlorosulphonic acid under gentle experimental conditions (J.A.C.S., 62, 1940, p.511). The compound V Obtained is used raw.

Step 4'

The grafting step corresponds to the condensing of the sulphochloride (V) with 6-amino-2-methyl-benzothiazole. The use of 4-(N,N-dimethylamino)pyridine (an acylation catalyst) makes it possible in particular to improve the yield of the condensation reaction (from 50 to 81%).

Step 5'

The cyclisation takes place under the same conditions as step (6) previously described which enables compound I1 to be obtained.

Obtaining compound C5 from intermediate I3

The quaternation of the nitrogen takes place under; the same conditions as previously

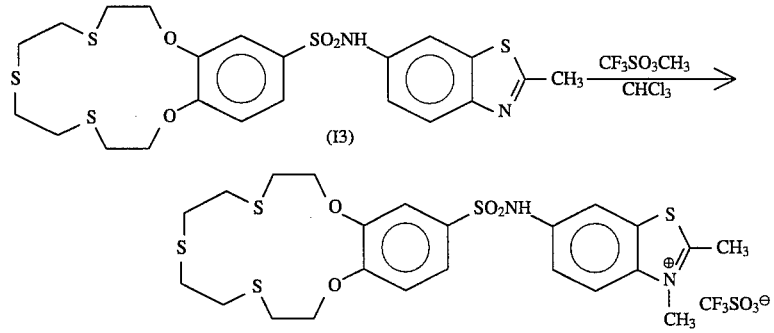

Obtaining thiacyanine C5

The experimental conditions are identical to the obtaining of C1

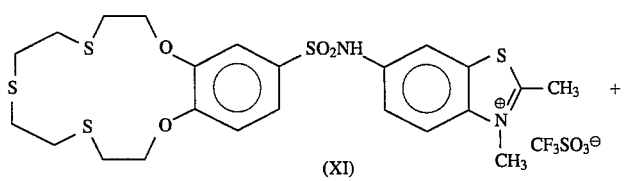

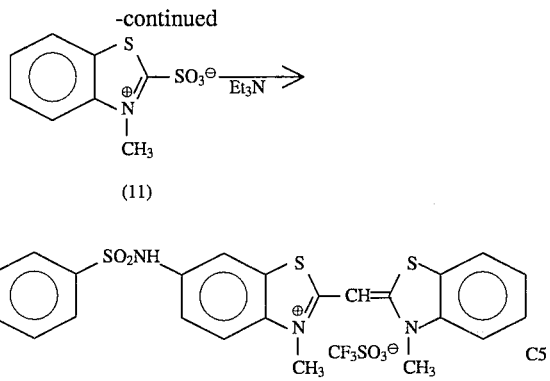
(11)
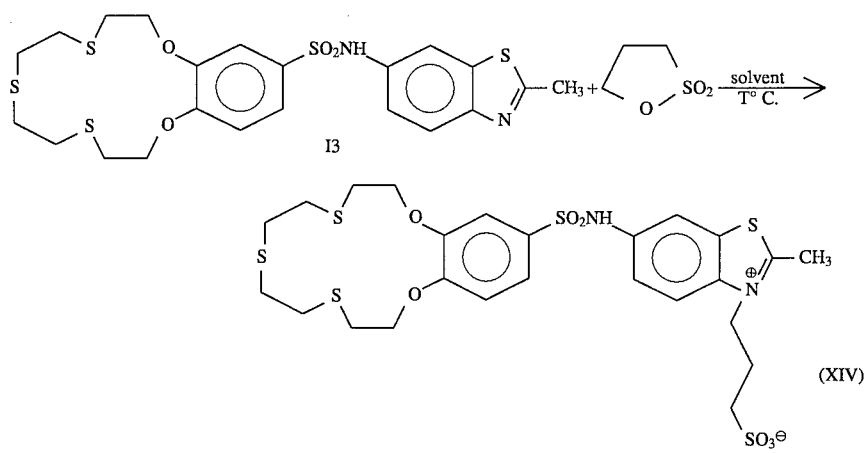
C5
Obtaining compound C6 from intermediate I3
(XIV)
Obtaining thiacyanine C6

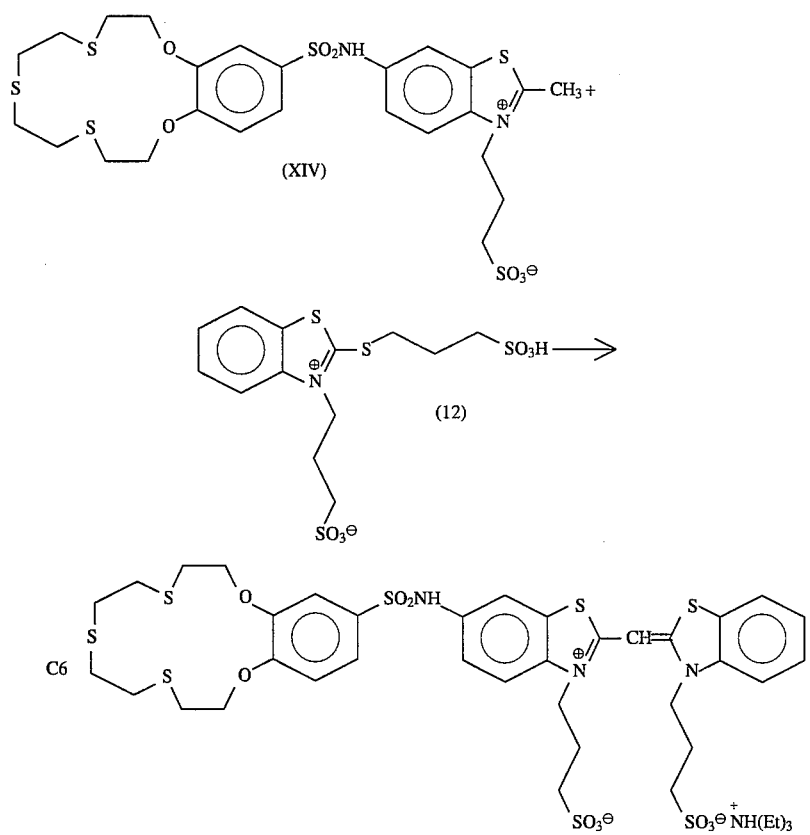
Example 2
It is preferable for compounds C2, C4 and C6 to effect the cyclization of the macrocyclic thioether after the obtaining of the cyanine.
Steps 1, 2, 3, 4 and 5 are identical to the steps described in example 1 which enables compound X to be obtained.
Compound X is then processed in accordance with the following steps:
a) alkylation of nitrogen
b) condensing
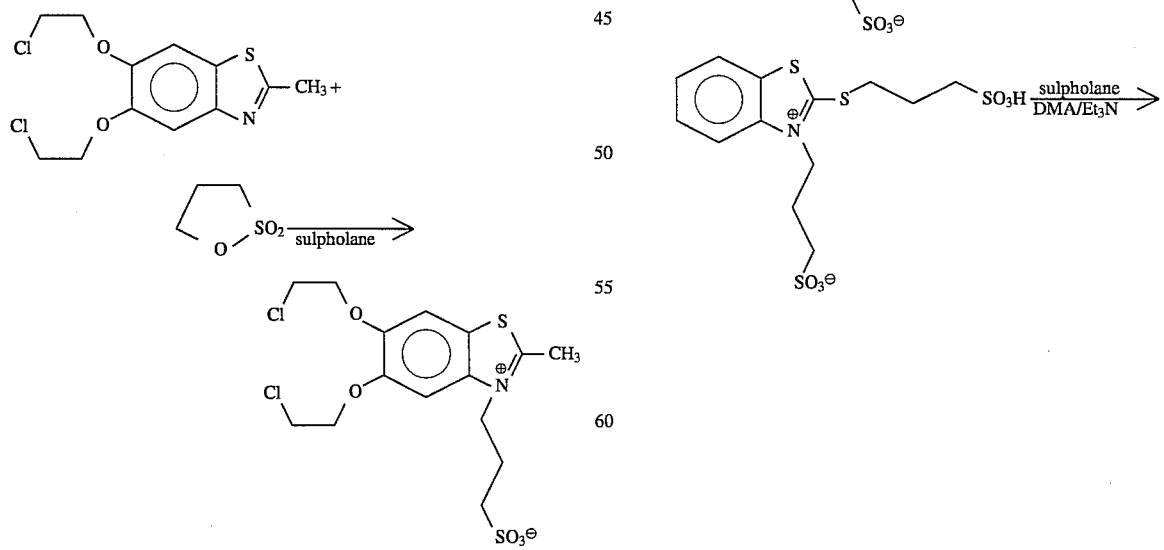

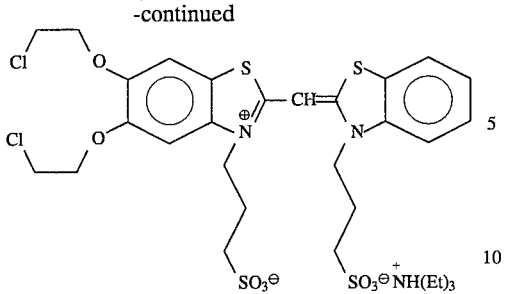

These steps are carried out under the conditions described in Example 1.

The cyclization of the macrocycle is then carried out:

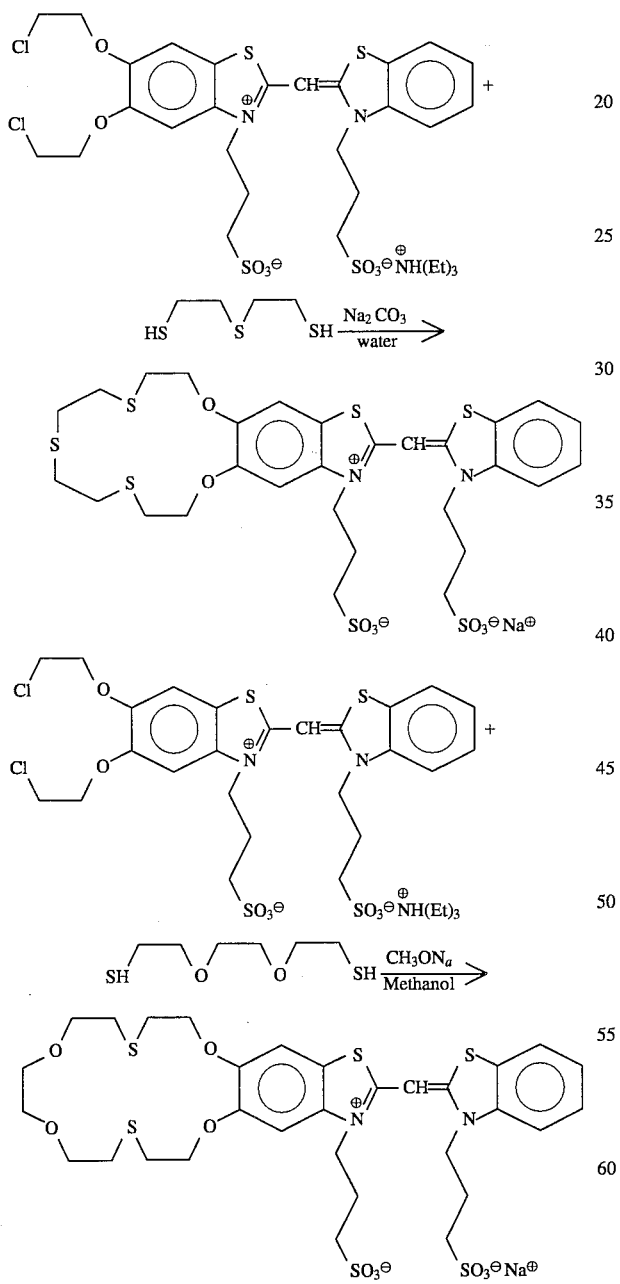

The cyclization is carried out at the boiling point of the solvent with an excess of the dithiol compound.

Taking compound VI as the starting product, compound C6 can be obtained in the same way.

Example 3—Photographic testing of the compound of the invention

A silver bromoiodide emulsion is prepared (1% iodide introduced throughout the precipitation) with tabular grains having a mean equivalent diameter of 1.3 μm and a mean thickness of approximately 0.10 μm, chemically sensitised with 5 mg/mole of Ag of $Na_2S_2O_3$, $5H_2O$, 1 mg/mole of Ag of KSeCN, 5 mg/mole of Ag of $KAuCl_4$, 150 mg/mole of Ag of sodium thiocyanate and 20 mg/mole of Ag of anhydro-5,6-dimethoxy-3-(3-sulphopropyl) benzothiazolium hydroxide. The following remelt additives are added to this:

| | |
|---|---|
| KI | 100 mg/mole of Ag |
| Tetraazaindene | 2.1 g/mole of Ag |
| Bisvinylsulphonylmethylether | 1% with respect to the total gelatin weight | together with increasing quantities of the compound C1 of the invention, as indicated in the following table.

In two other identical emulsions, the compound of the invention is replaced with increasing quantities of the following reference compounds:

REFERENCE A

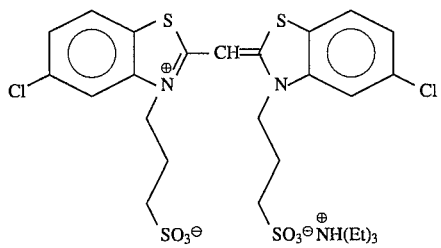

REFERENCE B

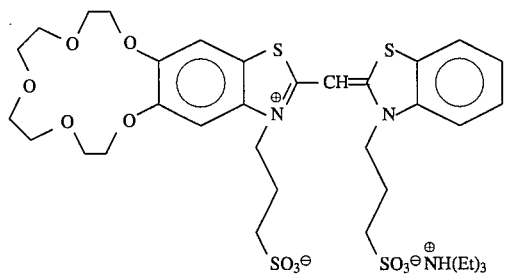

The emulsions are spread with a coverage of 32 mg of silver per dm2, and then the films obtained are exposed under a Wratten[R] 39 filter and a neutral density of 1.01 at 2650° K. and 1/50 s. The films are processed with a Kodak Mx810 developer.

The photographic results set out in the following table are obtained after 24 hours of incubation at 50° C. and 50% humidity:

| | After 24 hours of incubation at 50° C. * 50% RH | | | | | |
|---|---|---|---|---|---|---|
| Compound | Quantity mg/Ag mole | Fog | CR10 | CT | DMax | Residual dye stain |
| None | | 0.21 | 405 | 2.13 | 3.14 | 0 |
| Reference A | 250 | 0.21 | 411 | 1.91 | 2.99 | 160 |
| " | 750 | 0.20 | 427 | 2.24 | 3.2 | 1000 |
| Reference B | 250 | 0.21 | 416 | 2.06 | 3.35 | <=9 |
| " | 500 | 0.21 | 415 | 2.18 | 3.45 | <=14 |
| " | 750 | 0.21 | 412 | 2.32 | 3.50 | 23 |
| Invention | 250 | 0.20 | 415 | 2.26 | 3.38 | 0 |
| " | 500 | 0.23 | 421 | 2.38 | 3.54 | <=5 |
| " | 750 | 0.24 | 424 | 2.37 | 3.60 | <=9 |

The residual dye stain is given by the height of the absorption peak of the residual dye at Dmin, expressed in relative units.

It can be remarked that the spectral sensitising dyes of the present invention enable the residual dye stain to be greatly reduced by improving the sensitivity, contrast and Dmax, the fogging level remaining substantially constant. This is all the more important since the sensitisation of flat grain emulsions necessitates the use of a large quantity of dye, which generally results in a strong residual dye stain.

We claim:

1. A spectral sensitising dye of the polymethine type characterised in that it comprises at least one macrocyclic thioether radical with at least one sulphur atom and at least one oxygen atom, each sulphur or oxygen atom being separated from another sulphur or oxygen atom by an alkylene group comprising at least 2 carbon atoms.

2. A spectral sensitising dye according to claim 1, in which the polymethine dye is selected from cyanines, merocyanines, oxonols, complex cyanines or merocyanines, hemioxonols, styryls, merostyryls, and streptocyanines.

3. A spectral sensitizing dye according to claim 1 in which the thioether macrocycle is condensed onto the polymethine dye, such that the dye has the formula:

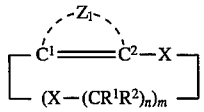

where
each x represents a sulfur or oxygen atom, with the additional requirement that at least one X represents a sulphur atom and at least one X represents an oxygen atom, $R^1$ and $R^2$ are independently a hydrogen atom or an alkyl, aryl or alkenyl group, either substituted or not, m is an integer equal to or greater than 1, n is an integer equal to or greater than 2, $C^1$ and $C^2$ represent the carbon atoms to which $Z^1$ is attached, $-Z^1$ represents the atoms required to form, with the $C^1$ and $C^2$ carbon atoms, the polymethine dye.

4. A spectral sensitising dye according to claim 1 in which the polymethine dye has substituted on it at least one thioether macrocycle according to one of the following formulae:

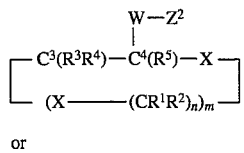

or

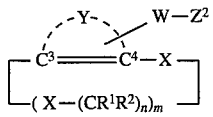

where
X represents a sulphur or oxygen atom, with the additional requirement that at least one X represents a sulphur atom and at least one X represents an oxygen atom, $R^1$ and $R^2$ are independently a hydrogen atom or an alkyl, aryl or alkenyl group, either substituted or not, m is an integer equal to or greater than 1, n is an integer equal to or greater than 2, Y represents the atoms required to form, with the $C^3$ and $C^4$ carbon atoms, a heterocyclic or carbocyclic aromatic compound, $Z^2$ is a polymethine spectral sensitising dye radical, W is a single bond or a linking group, $R^3$, $R^4$ and $R^5$ are independently a hydrogen atom or an alkyl group, substituted or not.

5. A spectral sensitising dye according to claim 3 having the formula

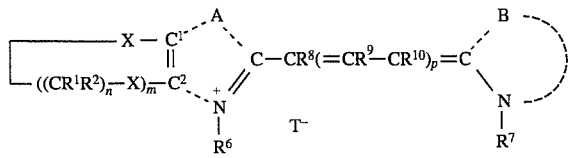

where
X represents a sulphur or oxygen atom, with the additional requirement that at least one X represents a sulphur atom and at least one X represents an oxygen atom, $R^1$ and $R^2$ are independently a hydrogen atom or an alkyl, aryl or alkenyl group, either substituted or not, m is an integer equal to or greater than 1, n is an integer equal to or greater than 2, $R^6$ $R^7$ represent independently an alkyl hydroxyalkyl, alkoxy, amine or amide group, substituted or not, or represent solubilising groups or another chromophore group, $R^8$, $R^9$ and $R^{10}$ are independently a hydrogen atom, an alkyl group, substituted or not, or taken together, represent the atoms required to form a saturated or unsaturated hydrocarbon ring which may contain one or more heteroatoms, A and B are independently the atoms required to complete the radicals of the thiazole, thiadiazole, benzothiazole, naphthothiazole, oxazole, benzoxazole, naphthoxazole, selenazole, benzoselenazole, naphthoselenazole, tellurazole, benzotellurazole, naphthotellurazole, quinoline, isoquinoline, naphthoquinoline, imidazole, benzoimidazole, naphthoimidazole, pyridine, benzopyridine or naphthopyridine groups, T⁻ is a complementary ion to balance the ionic charge of the nitrogen when R⁶ is neutral, selected from the group of halide anions or tetrafluoroborate anions, triflate anions, or alkyl or aryl sulphonate anions, p is between 0 and 3.

6. A spectral sensitising dye according to claim 4 in which Z² may be represented by either of the formulae:

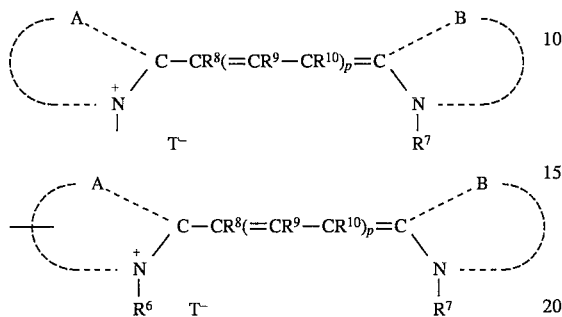

wherein:

R⁶, R⁷ represent independently an alkyl hydroxyalkyl, alkoxy, amine or amide group, substituted or not, or represent solubilising groups or another chromophore group, R⁸, R⁹ and R¹⁰ are independently a hydrogen atom, an alkyl group, substituted or not, or taken together, represent the atoms required to form a saturated or unsaturated hydrocarbon ring which may contain one or more heteroatoms, A and B are independently the atoms required to complete the radicals of the thiazole, thiadiazole, benzothiazole, naphthothiazole, oxazole, benzoxazole, naphthoxazole, selenazole, benzoselenazole, naphthoselenazole, tellurazole, benzotellurazole, naphthotellurazole, quinoline, isoquinoline, naphthoquinoline, imidazole, benzoimidazole, naphthoimidazole, pyridine, benzopyridine or naphthopyridine groups, T⁻ is a complementary ion to balance the ionic charge of the nitrogen when R⁶ is neutral, selected from the group of halide anions or tetrafluoroborate anions, triflate anions, or alkyl or aryl sulphonate anions, p is between 0 and 3.

7. A spectral sensitising dye according to claim 5 in which R6 and R7 are solubilising groups selected from the alkylsulphonate, arylsulphonate, alkylcarboxylate, —CF3, alkylsulphone, hydroxyalkyl and alkylphosphoryl groups.

8. A spectral sensitising dye according to claim 3, having the formula:

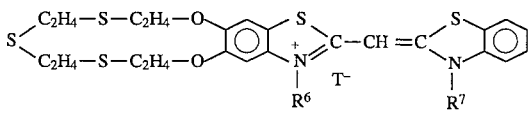

where

R⁶ and R⁷ are both —CH₃ and T⁻ is CF₃SO₃⁻ or

R⁶ is —(CH₂)₃SO₃— and R⁷ is —(CH₂)₃SO₃⁻, HN⁺(Et)₃.

9. A spectral sensitising dye according to claim 3, having the formula:

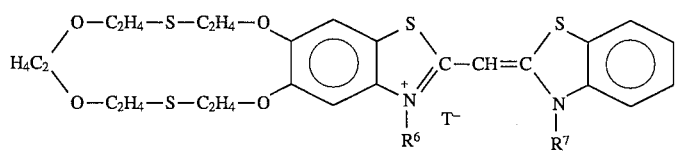

R⁶ and R⁷ are both —CH₃ and T⁻ is CF₃SO₃⁻ or
R⁶ is —(CH₂)₃SO₃⁻ and R⁷ is —(CH₂)₃SO₃⁻, HN⁺(Et)³.

10. A spectral sensitising dye according to claim 13, having the formula:

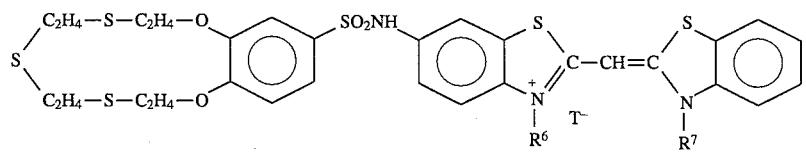

R⁶ and R⁷ are both —CH₃ and T⁻ is CF₃SO₃⁻ or
R⁶ is —(CH₂)₃SO₃⁻ and R⁷ is —(CH₂)₃SO₃⁻, HN⁺(Et)₃.

11. A photographic element comprising a base medium and at least one layer of sensitised silver halide emulsion sensitized with the spectral sensitising dye of any one of the preceding claims.

12. A photographic element according to claim 11, in which the emulsion is a tabular grain silver halide emulsion.

13. A spectral sensitizing dye according to claim 5 wherein A is the atoms required to complete the radical of the benzothiazole group.

14. A spectral sensitizing dye according to claim 13 wherein B represents the atoms required to complete a benzothiazole.

15. A photographic element comprising a base medium and at least one layer of sensitised silver halide emulsion sensitized with the spectral sensitising dye of claim 13.

16. A photographic element comprising a base medium and at least one layer of sensitised silver halide emulsion sensitized with the spectral sensitising dye of claim 14.

* * * * *